United States Patent [19]

Howell

[11] 4,418,892

[45] Dec. 6, 1983

[54] ALUMINUM FURNACE SKIM RECOVERY SYSTEM

[76] Inventor: Frank H. Howell, 150 S. Detroit St., Los Angeles, Calif. 90036

[21] Appl. No.: 376,665

[22] Filed: May 10, 1982

[51] Int. Cl.³ .............................................. F27B 14/02
[52] U.S. Cl. .................................. 266/137; 266/213;
75/24; 75/65 R; 75/68 R; 241/76
[58] Field of Search ...................... 266/137, 213, 248;
241/76, 24, 77, 78; 75/24, 68 R, 65 R

[56] References Cited

U.S. PATENT DOCUMENTS 3,999,980 12/1976 Montagna .......................... 75/68 R
4,057,232 11/1977 Ross et al. .......................... 266/227

Primary Examiner—M. J. Andrews
Attorney, Agent, or Firm—Warren F. B. Lindsley

[57] ABSTRACT

A reclaiming method and apparatus for reclaiming aluminum from the skim recovered from an aluminum furnace by a highly mechanized method and apparatus.

5 Claims, 3 Drawing Figures

ALUMINUM FURNACE SKIM RECOVERY SYSTEM

BACKGROUND OF THE INVENTION

The reclamation of metals from the skim of aluminum furnaces has been attempted with a limited amount of success. The importance of recycling such scrap materials has become increasingly apparent as the depletion of ore reserves drives prices higher. At the same time, the high cost of fuels and the high level of energy utilization involved in the separation and refinement of metals makes it doubly important that the salvage operations be rendered as effective and efficient as possible.

In the present salvaging operation of the skim of aluminum furnaces, a good share of the small particles of aluminum and the aluminum oxide powders are lost. Accordingly, it becomes necessary to effectively optimize the salvage operation to conserve materials and energy.

SUMMARY OF THE INVENTION

In accordance with the invention claimed, an improved metal reclaiming system is provided for separating and reclaiming small particles of aluminum from the skim of aluminum furnaces.

It is, therefore, one object of this invention to provide an improved reclaiming system for the aluminum from the skim of aluminum furnaces in a highly mechanized form.

Another object of this invention is to provide such a reclaiming system in which small particles of aluminum are elongated flattened and widened in order to separate them more easily from aluminum oxide powder.

A further object of this invention is to provide such a system which salvages a maximum percentage of the total metal content from the initial charge of waste.

A still further object of this invention is to provide a closed system in which the salvaged metal is fed back into the melting furnace.

A still further object of this invention is to provide a highly optimized aluminum reclaiming system which produces maximum benefits in terms of conservation of energy and materials.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings which are diagrammatic illustrations of the reclaiming system of this invention wherein:

DESCRIPTION OF THE PREFERRED EMBODIMENT

Figure 1:
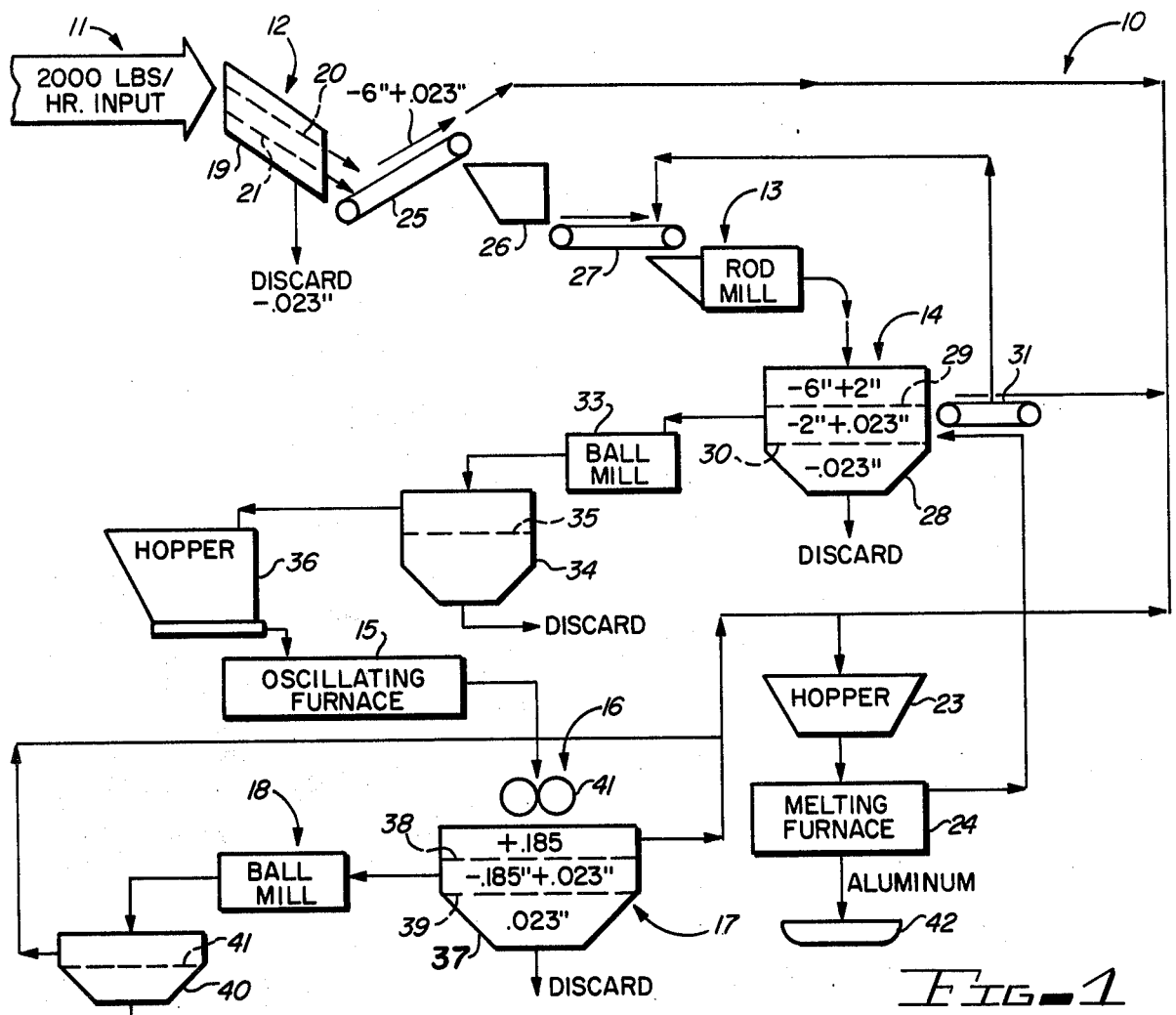
FIG. 1 is a diagrammatic illustration of a process for recovering metallic aluminum from furnace or ladle skimming by hot roll crushing.

Referring more particularly to the drawings by characters of reference, FIG. 1 illustrates a reclaiming system 10 of the invention comprising a number of subsystems including an input stage 11, a first screening stage 12, a rod mill 13, a second screening stage 14, a processing or oscillating furnace stage 15, a roller mill 16, a third screening stage 17 and a ball mill 18.

The input stage 11 may comprise any suitable means such as a tractor front wheel loader, well known in the art, which loads the first screening stage 12.

The first screening stage 12 may be simply a large rectangular steel box 19, open at the top and fitted with two parallelly arranged, juxtapositioned, stacked screens 20, 21 which separate the dross particles received for three different functions. The dross particles 6 inches or larger are sent directly to the hopper 23 of a melting furnace 24; the particles minus 6 inches but plus 0.023 inches are transported by a conveyor 25 to a hopper 26; and the dross particles smaller than 0.023 inches are discarded.

The dross particles collected in hopper 26 of a particle size of minus 6 inches but plus 0.023 inches are transported by a conveyor 27 to rod mill 13, the output of which is fed into a hopper 28 of the second screening stage 14.

Hopper 28 is provided with two screens 29 and 30 which separate minus 6-inch but plus 2-inch particles, minus 2-inch but plus 0.023-inch particles and minus 0.023-inch particles from the material supplied. The minus 6 but plus 2-inch particles are examined with the free aluminum pieces fed into the hopper 23 of melting furnace 24 and the other portion of the fraction fed by a conveyor 31 back to rod mill 13 with the minus 2-inch but plus 0.023-inch particles fed into a ball mill 33. The output of ball mill 33 is transmitted to a hopper 34 where it is screened by a screen 35 with the particles larger than 0.023 inches transmitted to a hopper 36 with the particles less than 0.023 inches discarded.

The content of hopper 36 is transmitted to the oscillating furnace 15 of the system.

The oscillating furnace heats the material received to approximately 1300 degrees F. with its output fraction being fed into the roller mill 16 which crushes any aluminum oxides, carbides or nitrides and converts the metallic aluminum into thin sheets of approximately 0.023 inches thick which are conveyed into a hopper 37 of the third screening stage 17. This hopper is provided with two screens 38 and 39. Screen 38 separates the plus 0.185-inch particles from the minus 0.185 but plus 0.023-inch particles. Screen 39 receives the discharge from screen 38 and separates the −0.185 but plus 0.023-inch particles from the −0.023-inch particles. The −0.023-inch particles are discarded. The plus 0.185-inch particles are transmitted to the melting furnace 24; and the minus 0.185 but plus 0.023-inch particles are transmitted to the ball mill 18.

The output of the ball mill 18 is transmitted to a hopper 40 which employs a screen 41 for further screening the fraction from the ball mill into particles of plus 0.023-inch and minus 0.023-inch sizes, with the minus 0.023-inch particles being discarded and the plus 0.023-inch particles being transmitted to hopper 23 of the melting furnace 24.

Molten aluminum from the melting furnace 24 is poured into molds 42 with the oxides of the furnace skimmed off and transmitted back to hopper 28 above screen 30 for reprocessing.

Figure 2:
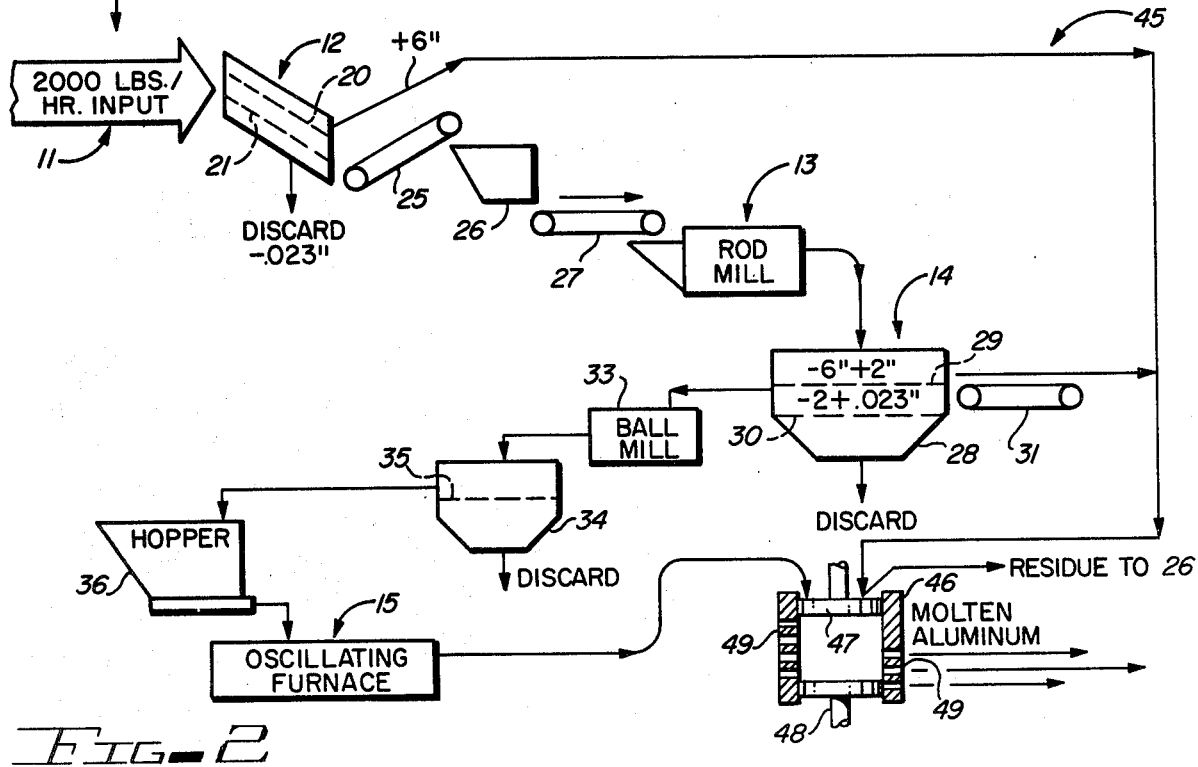
FIG. 2 is a diagrammatic illustration of a process of recovering metallic aluminum from furnace or ladle skimming by perforated cylinder pressing.

FIG. 2 discloses a process for recovering metallic aluminum from furnace or ladle skimming by the use of perforated cylinder pressing. The reclaiming system 45 shown in FIG. 2 comprises the same system components of FIG. 1 to the point of the oscillating furnace 15 with all of the parts given the same reference characters.

The fraction of the dross minus 2 inches but plus 0.023 inches in size processed by the oscillating furnace 15 which has been heated to approximately 1300 degrees F. is transmitted to a 4-inch diameter and 6-inch deep perforated cylinder 46. Cylinder 46 is open-ended and is provided with a pair of rams 47 and 48 operating one in each end of the cylinder. The cylinder is provided with a plurality of apertures 49 through which the molten aluminum under pressure of the rams flows out of the cylinder. Upon movement of ram 47 into cylinder 46, the molten aluminum flows through apertures 49 in the walls of cylinder 46 and falls into a mold (not shown). The residue of oxides, carbides and nitrides are retained in the cylinder. At the completion of the stroke of ram 47, the second ram 48 formed in the bottom of the perforated cylinder 46 moves upwardly removing the residue through the top of the cylinder 46. This residue of oxides, carbides and nitrides, etc. from cylinder 46 is transmitted to hopper 26.

Figure 3:
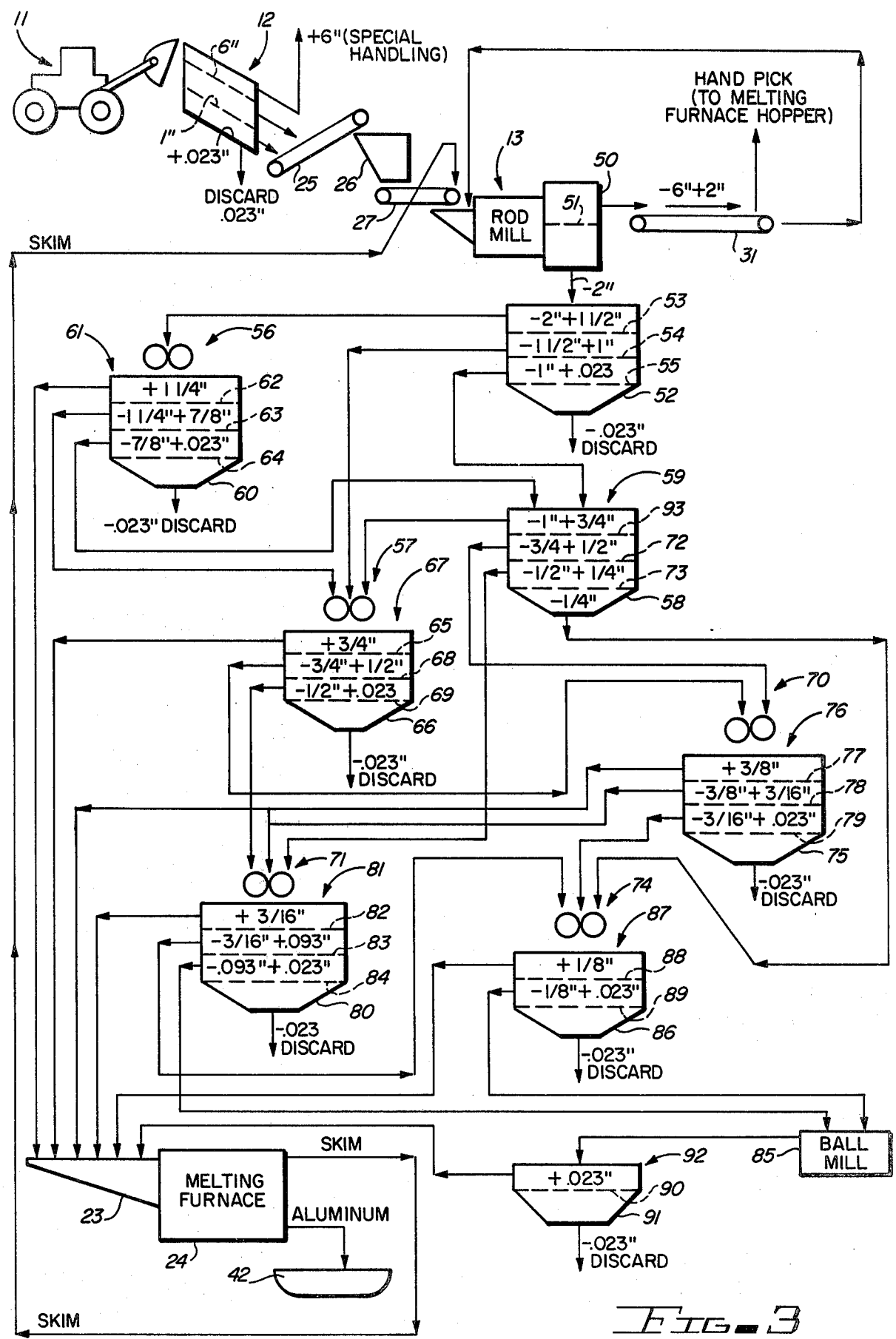
FIG. 3 is a diagrammatic illustration of a process for recovering metallic aluminum from furnace or ladle skimming by multiple cold roll crushing and screening steps.

FIG. 3 discloses a further modification of the reclaiming system shown in FIGS. 1 and 2 wherein similar parts are given the same reference characters.

It should be noted that FIGS. 1, 2 and 3 are similar from the input stage 11 to rod mill 13, at which point the output fraction of rod mill 13 is screened by a screening stage 50 comprising a single screen 51. The particles minus 6 inches but plus 2 inches in size are transported by conveyor 31 back to the input of the rod mill 13. Free aluminum pieces transported by conveyor 31 are hand-picked and transmitted directly to the melting furnace 24. The fraction of ore minus 2 inches is discharged from the screening means 50 and deposited in a hopper 52 of the third screening stage. Hopper 52 employs three parallel, juxtapositioned screens 53, 54 and 55 with screen 53 separating the minus 2-inch but plus 1½-inch fraction from the remainder, which fraction is transported to a cold roll crusher 56 which elongates, flattens and widens the aluminum particles and crushes the carbides, nitrides and oxides to a smaller size. The minus 1½-inch but plus 1-inch particles are retained by screen 54 and transported to a cold roll crusher 57. The minus 1-inch but plus 0.023-inch particles retained by screen 55 are transported to a hopper 58 of a triple deck screening means 59 with the minus 0.023-inch particle size passing through screen 55 discarded.

The cold roll crusher 56 is set at 1¼ inches with this or smaller size particles discharged into a hopper 60 of a screening means 61. Hopper 60 contains three juxtapositioned parallel screens 62, 63 and 64 which screen and separate the fraction received from the cold roll crusher 56.

Screen 62 separates the plus 1¼-inch particles from the rest which are passed therethrough, which particles are transported to hopper 23 of the melting furnace 24. Screen 63 separates the minus 1¼-inch but plus ⅜-inch particles from the rest, which particles are transported to cold roll crusher 57. Screen 64 separates the minus ⅜-inch but plus 0.023-inch particles from the remainder, which particles are transported to the top of screen 93 in the hopper 58 of the screening means 59. The remainder of minus 0.023 particles passing through screen 64 are discarded.

Cold roll crusher 57 is set at ¾ of an inch and thus passes ¾ of an inch particles onto the top screen 65 in hopper 66 of a screening means 67. Hopper 66 further contains two other juxtapositioned and parallelly arranged screens 68 and 69.

The particles of plus ¾ of an inch are transported from the top of screen 65 to hopper 23 with the particles remaining on the top of screen 68 of minus ¾ of an inch but plus ½ inch transported to a cold roll crusher 70. The minus ½-inch but plus 0.023-inch particles retained by screen 69 are transported to a cold roll crusher 71. The fraction passing through screen 69 of minus 0.023 inches in size is discarded.

The screening means 59, in addition to housing screen 93 in hopper 58, contains two further juxtapositioned and parallelly arranged screens 72 and 73. Screen 93 retains the minus 1 but plus ¾ of an inch particles which are transported to cold roll crusher 57. The minus ¾-inch but plus ½-inch particles retained by screen 72 in hopper 58 are transported to cold roll crusher 70. The minus ½-inch but plus ¼-inch particles retained by screen 73 of hopper 58 are transported to cold roll crusher 71. The minus ¼-inch particles passed by screen 73 of hopper 58 are transported to a cold roll crusher 74.

Cold roll crusher 70, which is set at ⅜ of an inch, discharges its fraction into a hopper 75 of a screening means 76. This hopper contains three juxtapositioned and parallelly arranged screens 77, 78 and 79.

The plus ⅜-inch particles retained by screen 77 are transported to hopper 23 while the minus ⅜ but plus 3/16-inch particles retained by screen 78 are transported to cold roll crusher 71. The minus 3/16 but plus 0.023-inch particles retained by screen 79 are transported to cold roll crusher 74. The minus 0.023-inch particles passed by screen 79 are discarded.

Cold roll crusher 71 is set at 3/16 of an inch with its discharged fraction of the material crushed conveyed into a hopper 80 of a further screening means 81. Hopper 80 contains three juxtapositioned and parallelly arranged screens 82, 83 and 84. Screen 82 retains plus 3/16-inch particles which are transported to hopper 23. The minus 3/16-inch but plus 0.093-inch particles retained by screen 83 are transported to cold roll crusher 74. The minus 0.093 but plus 0.023-inch particles retained by screen 84 are transported to a ball mill 85 with the minus 0.023-inch particles passing therethrough being discarded.

The cold roll crusher 74 is set at ⅛ of an inch and discharges this size particle into a hopper 86 of a screening means 87. Hopper 86 contains two juxtapositioned and parallelly arranged screens 88 and 89. The fraction of the material of plus ⅛-inch size particles retained by screen 88 is transported to hopper 23. The minus ⅛ but plus 0.023-inch fraction retained by screen 89 is transported to ball mill 85 with the fraction −0.023 passed through screen 89 discarded.

Ball mill 85 discharges the fraction of the material received onto a single screen 90 in a hopper 91 of a screening means 92. The plus 0.023-inch fraction retained on screen 90 is transported to hopper 23 with the minus 0.023-inch fraction of the material passed by screen 90 discarded.

Molten aluminum from the melting furnace is poured into molds 42 with the oxides of the furnace skimmed off and transmitted back to rod mill 13.

It should be noted that all of the screens disclosed may be vibrated or moved in any suitable well-known manner to accomplish their function; and the dross fractions can be conveyed from system station or stage to another by any suitable conveyor means.

Although but a few embodiments of the present invention have been illustrated and described, it will be apparent to those skilled in the art that various changes and modifications may be made therein without departing from the spirit of the invention or from the scope of the appended claims.

What is claimed is:

1. A reclaiming system for recovering aluminum from skim material of an aluminum furnace comprising:

first, second and third screening means, said first screening means comprising two vertically positioned screens with the first screen positioned to receive the skim material and retaining on its surface a first size fraction of the material for movement into an aluminum furnace and passing therethrough and onto the second screen a first remainder of the material, said second screen retaining on its surface a second size fraction of the material for movement into a rod mill and passing therethrough a second, aluminum poor remainder of the material which is discarded, a rod mill, said rod mill discharging the second size fraction of the material received into said second screening means, said second screening means comprising third and fourth vertically positioned screens with the third screen positioned for receiving said second size fraction and retaining on its surface a third size fraction and passing therethrough onto said fourth screen a third remainder, said third size fraction being moved back into said rod mill for further elongation, flattening and widening of aluminum particles forming a part thereof, said fourth screen retaining on its surface a fourth size fraction and passing through a fourth, aluminum poor remainder of the material which is discarded, said fourth size fraction being conveyed into a crushing means, a crushing means, said crushing means discharging said fourth fraction into said third screening means, said third screening means comprising a fifth screen for receiving thereon said fourth size fraction received from said crushing means, said fifth screen retaining thereon a fifth size fraction and passing therethrough a fourth remainder which is aluminum poor and is discarded, a hopper and an associated processing furnace, said fifth size fraction being moved into said hopper, said hopper discharging said fifth size fraction into said processing furnace, said processing furnace discharging a fifth remainder which is aluminum rich, and means for receiving said fifth remainder for converting it into molten aluminum.

2. The reclaiming system set forth in claim 1 wherein: said crushing means comprises a ball mill or roller mill.

3. The reclaiming system set forth in claim 2 wherein: said processing furnace heats the material to approximately 1300 degrees F.

4. The reclaiming system set forth in claim 2 wherein: said means comprises an aluminum melting furnace.

5. The reclaiming system set forth in claim 2 wherein: said processing furnace comprises an oscillating furnace.

* * * * *